US007522916B2

(12) United States Patent
Grossi et al.

(10) Patent No.: US 7,522,916 B2
(45) Date of Patent: Apr. 21, 2009

(54) METHOD OF PROVIDING INFORMATION

(75) Inventors: Mark M. Grossi, Dundee (GB); Martin R. Smith, Dundee (GB)

(73) Assignee: NCR Corporation, Dayton, OH (US)

( * ) Notice: Subject to any disclaimer, the term of this patent is extended or adjusted under 35 U.S.C. 154(b) by 196 days.

(21) Appl. No.: 11/189,571

(22) Filed: Jul. 26, 2005

(65) Prior Publication Data

US 2005/0282539 A1 Dec. 22, 2005

Related U.S. Application Data

(63) Continuation of application No. 10/270,943, filed on Oct. 15, 2002, now Pat. No. 6,959,187.

(30) Foreign Application Priority Data

Oct. 20, 2001 (GB) ................................ 0125243.6

(51) Int. Cl.
*H04Q 7/20* (2006.01)

(52) U.S. Cl. .................... 455/423; 455/414.1; 455/420; 455/556.1

(58) Field of Classification Search ................. 455/423, 455/424, 410, 411, 412.1, 412.2, 404.1, 9, 455/406, 414.1, 420, 556.1; 79/114.2, 114.19, 79/114.14, 114.22; 705/43, 45
See application file for complete search history.

(56) References Cited

U.S. PATENT DOCUMENTS 5,095,530 A 3/1992 Tanaka et al.
5,625,668 A 4/1997 Loomis et al.
5,697,064 A 12/1997 Okamoto et al.
5,779,545 A 7/1998 Berg et al.
5,784,439 A * 7/1998 Nagelmann et al. ...... 379/91.01
5,984,178 A 11/1999 Gill et al.
6,028,522 A * 2/2000 Petite ......................... 340/641
6,060,994 A 5/2000 Chen (Continued)

FOREIGN PATENT DOCUMENTS

EP 0 712 099 A1 5/1996

(Continued)

OTHER PUBLICATIONS

MOBIC: "Nortel Networks Unveils Wireless eBusiness Solution for Field Service, Support", The Mobile Internet Company, 'Online!, Jan. 2001, XP002263114, retrieved from the Internet: <URL:http://www.mobic.com/oldnews/2001/01/nortel_networks_wireless.htm>, 'retrieved Nov. 26, 2003!

(Continued)

*Primary Examiner*—CongVan Tran
(74) *Attorney, Agent, or Firm*—Michael Chan

(57) ABSTRACT

A method of providing information to a user at a remote terminal (12) is described. The method comprises the steps of: receiving from the remote terminal (12) status information relating to an irregularity in the remote terminal; determining from the status information what action may be required to resolve the irregularity; identifying an agent capable of performing the action; transmitting the status information to a portable device (50) associated with the agent to inform the agent of the irregularity; and allowing the portable device (50) to access a repository containing operational information for presentation to the agent.

4 Claims, 1 Drawing Sheet

U.S. PATENT DOCUMENTS

| | | | | | |
|---|---|---|---|---|---|
| 6,081,791 | A * | 6/2000 | Clark | | 705/43 |
| 6,218,953 | B1 * | 4/2001 | Petite | | 340/641 |
| 6,219,556 | B1 | 4/2001 | Lee | | |
| 6,295,448 | B1 * | 9/2001 | Hayes et al. | | 455/420 |
| 6,490,443 | B1 * | 12/2002 | Freeny, Jr. | | 455/406 |
| 6,617,979 | B2 | 9/2003 | Yoshioka | | |
| 6,973,172 | B1 * | 12/2005 | Bitove et al. | | 379/114.2 |
| 2002/0022453 | A1 * | 2/2002 | Balog et al. | | 455/41 |
| 2002/0152169 | A1 * | 10/2002 | Dutta et al. | | 705/45 |
| 2003/0046231 | A1 * | 3/2003 | Wu | | 705/43 |
| 2003/0089767 | A1 * | 5/2003 | Kiyomatsu | | 235/379 |
| 2006/0068817 | A1 * | 3/2006 | Black et al. | | 455/466 |

FOREIGN PATENT DOCUMENTS

| | | | |
|---|---|---|---|
| EP | 0 977 163 A2 | | 2/2000 |
| JP | 01096758 A | * | 4/1989 |
| JP | 01233954 A | * | 9/1989 |
| JP | 09305833 A | * | 11/1997 |
| JP | 02000163633 | * | 6/2000 |

OTHER PUBLICATIONS

Citrin W V et al: "PDA-based graphical interchange for field service and repair workers", Computer and Graphics, Pergamon Press LTD. Oxford, GB, vol. 20, No. 5, Sep. 1, 1996, pp. 641-649.

Chris Goldman: "Airplane repair on the fly", Wireless Review, 'Online!, Sep. 10, 2001, XP002263115, retrieved from the Internet: <URL:http://wirelessreview.com/microsites/newsarticle.asp?mode+print&newsarticlesid=229775&released=&srid=11393&magazineid=9&siteid=3>, retrieved Nov. 26, 2003!

"Astea Expanding Award-winning eCRM Solutions With Short Message Service—SMS—and wireless Application Protocol—WAP—", The Mobile Internet Community, 'Online! Sep. 2000, XP002263116, retrieved from the Internet: <URL:http://www.mobic.com/oldnews/2000/09/astea_expanding_award.htm>, 'retrieved Nov. 26, 2003!

Freedom Technology Media Group: "Tech Tools", Field Force Automation, 'Online!, May 2001, pp. 1-4, XP002263117, retrieved from the Internet: <URL:http://www.unipress.com/ffamagarticle//ffamag.html>, 'retrieved Nov. 27, 2003!

Sellin R: "Neue Mobile Perspektiven Mit Wap", NTZ (Nachrichtentechnischezeitschrift), Vde Verlag GMBH. Berline, DE, vol. 52, No. 11, 1999, pp. 50-53.

* cited by examiner

METHOD OF PROVIDING INFORMATION

This application is a continuation of application Ser. No. 10/270,943, filed Oct. 15, 2002 now U.S. Pat. No. 6,959,187.

BACKGROUND OF THE INVENTION

The present invention relates to a method of providing information to a user at a remote terminal. In particular, the invention relates to a method of providing status and operational information to an agent to enable the agent to resolve an irregularity at the remote terminal. The invention has particular application to automated teller machine (ATM) networks.

In a typical ATM network, each ATM reports status information to a central management center. This status information indicates the state of health of an ATM, and may include details of the number and types of transactions that have been executed by the ATM.

When an irregularity occurs at the ATM (conventionally referred to as an incident), then the ATM sends a status report including a fault code to the central management center. This fault code indicates the nature of the incident. Examples of possible incidents include: the ATM having run out of media (such as receipt paper, cash, journal paper, and such like) or anticipated to run out of media in the near future, and a module in the ATM malfunctioning (for example, a card reader being unable eject a card).

The central management center uses this fault code to determine the nature of the incident. If the incident requires replenishment (either immediately or some time in the near future) then a human operator typically contacts a replenisher to replenish the ATM. If the incident requires some maintenance then the operator typically selects and contacts a suitable service agent to resolve the incident. The skill level of the service agent selected may depend on the nature of the incident. Typically there are two skill levels of service agent: those who can perform first line maintenance, and those who can perform second line maintenance.

First line maintenance is used to resolve incidents that do not require specialist tools or a skilled technician. Second line maintenance is more expensive than first line maintenance, and is used for those incidents that require specialist tools and a skilled technician.

One problem commonly experienced with second line maintenance is that the service agent has to contact the operator to obtain more information relating to the incident or how to resolve the incident. If this information is detailed and/or technical, then the operator may have to fax the information to the agent, which can be difficult if the agent has limited access to a fax machine.

SUMMARY OF THE INVENTION

It is among the objects of an embodiment of the present invention to obviate or mitigate the above disadvantage or other disadvantages associated with prior art methods of providing information.

According to a first aspect of the present invention there is provided a method of providing information to a user at a remote terminal comprising the steps of: receiving from the remote terminal status information relating to an irregularity in the remote terminal; determining from the status information what action may be required to resolve the irregularity; identifying an agent capable of performing the action; transmitting the status information to a portable device associated with the agent to inform the agent of the irregularity; and allowing the portable device to access a repository containing operational information for presentation to the agent.

In a preferred embodiment, the information is transmitted using a protocol designed to enable portable devices to access facilities such as, or similar to, the World Wide Web (hereinafter referred to as the "Web"), suitable protocols include the wireless application protocol (WAP) and I-mode. Such protocols are specifically designed for low bandwidth communication, and ensure that Web content is optimally rendered for delivery to handheld devices.

The operational information may include details of how to perform the required action, when the action was last performed, and such like.

Preferably, the status information identifies the remote terminal and includes details of where the terminal is located. Preferably, the portable device is a handheld device, such as a cellular radio-frequency telephone (cellphone), a portable digital assistant (PDA), a device combining the functions of a cellphone and a PDA, or such like.

This aspect of the present invention has the advantage that it is possible to deliver more detailed information about faults within the network to a remote agent. It is also possible to deliver this information relatively quickly.

According to a second aspect of the present invention there is provided a management server for use with a network of remote terminals, the server comprising: a management application for receiving status information from the remote terminals and for notifying when the status information indicates an irregularity in a remote terminal; and a wireless protocol server for providing operational information relating to the irregularity; whereby, a service agent may download information from the wireless protocol server to enable the agent to resolve the irregularity.

Preferably, the management application communicates status information for storing on the wireless protocol server to allow an agent to access historical status information relating to a terminal.

An irregularity may relate to a problem that is currently being experienced (for example, a faulty module, lack of media in a module, and such like), or to a problem that is predicted to occur in the future (for example, media present in a module but below a predetermined level).

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
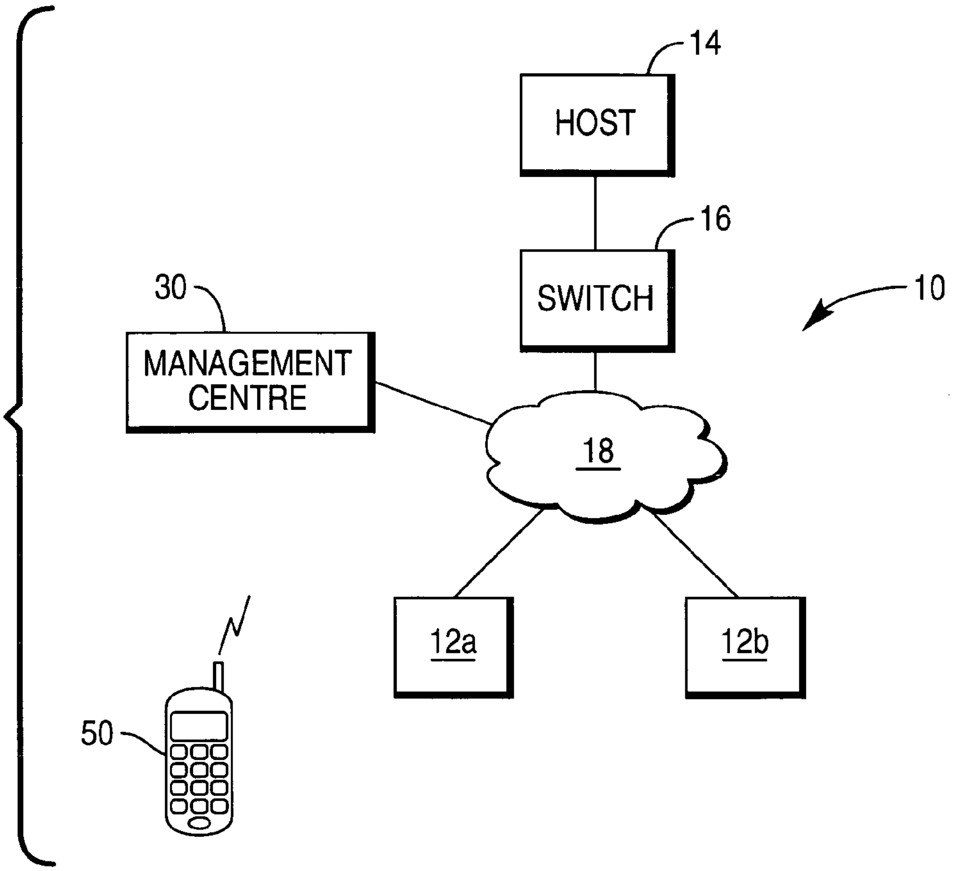
FIG. 1 is a block diagram of a self-service terminal network according to one embodiment of the present invention.

Reference is now made to FIG. 1, which is a simplified block diagram of a self-service terminal network 10, in the form of an ATM network, according to one embodiment of the present invention. The ATM network 10 is owned and operated by a financial institution, and comprises a plurality of ATMs 12 (only two of which are shown) connected to a host 14 for authorizing transactions via a transaction switch 16 and a secure network 18. The switch 16 is also connected to interchange networks (not shown) for authorizing transactions relating to accounts held with other institutions.

Figure 2:
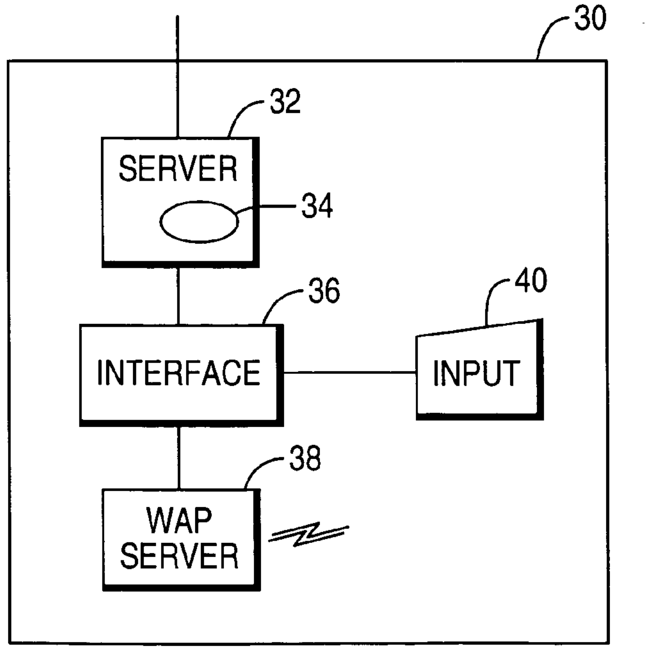
FIG. 2 is block diagram of part (a management center) of the network of FIG. 1.

A management center 30 is connected to the secure network 18 and receives status information from each ATM 12 via the network 18. The management center 30 is shown in more detail in FIG. 2 and includes: a management server 32 executing a management application 34, an interface 36 to a human operator, and a wireless protocol server 38 in the form of a WAP server.

In this embodiment, the management application 34 is the CA Unicenter product (trade mark) available from Computer Associates, One Computer Associates Plaza, Islandia, N.Y., 11749, U.S.A.

The human operator receives information from the interface 36, and has input means 40 (in the form of a keyboard and mouse) for inputting data to the management server 32 and WAP server 38.

Each ATM 12 in the network 10 periodically sends status information to the management center 30 to enable the management center 30 to monitor the operation of the network 10. If an incident occurs at an ATM 12, the ATM 12 sends status information including a fault code indicating the nature of the problem.

In this embodiment, an example of a banknote jamming in a cash dispenser of ATM 12*a* will be used. When this occurs, the ATM 12*a* sends a status report to the management center server 32 including a fault code indicating that a jam has occurred within the cash dispenser of the ATM 12*a*.

The management application 34 alerts a human operator via the interface 36 that an incident has occurred and provides the operator with a description of the fault. The human operator contacts a second line maintenance person (a service agent) to instruct them to clear the jam at the ATM 12*a*.

Each second line maintenance person carries a portable device 50 (FIG. 1) in the form of a cellular radio-frequency telephone. In this embodiment, the telephone is a WAP-enabled Ericsson (trade mark) R380s handset.

The instruction from the operator to the service agent may be communicated by a telephone call to the service agent's cell phone 50. The operator then uses input means 40 to inform the management application 34 that a service agent has been dispatched. The management application 34 conveys details of the incident to the WAP server 38 via the interface 36.

The service agent travels to the ATM 12*a* and then assesses the incident; in this example, a banknote is jammed in the cash dispenser. The service agent clears the jam by removing the banknote, and then investigates what may have caused the banknote to jam. If the service agent thinks that the banknote jam may have been caused by the relative timing of components within the cash dispenser (pick module, presenter module, and stacker wheel), then the service agent can use the cell phone 50 to access the WAP server 38. The WAP server 38 contains details of all the timing requirements and settings for each type of cash dispenser. The WAP server 38 also contains details of previous incidents relating to the ATM 12*a*, enabling the service agent to determine if the ATM 12*a* has been susceptible to banknotes jamming in the cash dispenser, and what action has been taken to resolve similar previous incidents.

Once the service agent has completed repair of the cash dispenser using information downloaded from the WAP server 38 to the cellphone 50, then the ATM 12*a* performs a health check to ensure that the cash dispenser is working correctly.

The service agent can then send a message to the operator informing the operator about the nature of the work performed, and that the incident has been resolved. The operator manually inputs this information using input means 40 (i.) to enable the management application 34 to close the incident, and (ii.) to update the WAP server 38 with the work performed.

The service agent may also access the management application 34 via the WAP server 38 to determine if any ATMs in the vicinity of ATM 12*a* requires any action to prevent an anticipated problem. For example, ATM 12*b* may be adjacent ATM 12*a* and may require journal printer paper replenished within the next few days. The service agent may replenish the journal printer and inform the management application 34 (via the WAP server 38) that the journal printer paper on ATM 12*b* has been replenished.

It will be appreciated that the above embodiment has the advantage that a service agent can access detailed technical information without having to carry any books or manuals, and also to access historical information relating to the terminal being serviced.

Various modifications may be made to the above described embodiment within the scope of the invention, for example, in other embodiments the ATMs (or the management application) may alert service agents directly in the event of an incident. In one such embodiment, an ATM that reports an incident may also send a text message to service agents describing the fault. When a service agent responds to this message, and resolves the incident, the agent can send a message to the management center to inform the management application about the nature of the work performed by the agent (for example, clearing a jam in a receipt printer). The management application may use this message to close the incident.

If a portable device carried by each service agent includes a global positioning system, then the ATM that reports an incident (or the management application) may be able to call the available service agent that is nearest to the ATM. If the ATM has access to cellular area information then this could be used to locate the nearest available service agent.

In other embodiments, the remote terminals may not be ATMs, they may be other types of self-service terminals such as non-cash kiosks, or they may be point of sale terminals. In other embodiments, the WAP server may be replaced by an I-mode server or a server implementing some other wireless protocol.

What is claimed is:

1. A method of a service agent servicing an incident associated with an automated teller machine (ATM), the method comprising:

receiving via a cellphone an instruction to be dispatched to assess the incident associated with the ATM; and using the cellphone to access a wireless protocol server which contains operational information relating to the incident associated with the ATM after the service agent has assessed the incident associated with the ATM.

2. A method of a service agent servicing an incident associated with an automated teller machine (ATM), the method comprising:

receiving via a cellphone an instruction to be dispatched to assess the incident associated with the ATM; and using the cellphone to access a wireless protocol server which contains historical information relating to the incident associated with the ATM after the service agent has made an assessment of the incident associated with the ATM to allow the service agent to service the incident.

3. An apparatus for enabling a service agent to service an incident associated with an automated teller machine (ATM), the apparatus comprising:

a cellphone for (i) allowing the service agent to receive an instruction to be dispatched to assess the incident associated with the ATM, and (ii) allowing the service agent to access a wireless protocol server which contains operational information relating to the incident associated with the ATM after the service agent has assessed the incident associated with the ATM to allow the service agent to service the incident.

4. An apparatus for enabling a service agent to service an incident associated with an automated teller machine (ATM), the apparatus comprising:

a cellphone for (i) allowing the service agent to receive an instruction to be dispatched to assess the incident associated with the ATM, and (ii) allowing the service agent to access a wireless protocol server which contains historical information relating to the incident associated with the ATM after the service agent has assessed the incident associated with the ATM to allow the service agent to service the incident.

* * * * *